US008949269B1

(12) United States Patent
Wolff

(10) Patent No.: US 8,949,269 B1
(45) Date of Patent: Feb. 3, 2015

(54) SPONSORED REGISTRY FOR IMPROVED COORDINATION AND COMMUNICATION

(75) Inventor: Gregory J. Wolff, Palo Alto, CA (US)

(73) Assignee: Gregory J. Wolff, Palo Alto, CA (US)

(*) Notice: Subject to any disclaimer, the term of this patent is extended or adjusted under 35 U.S.C. 154(b) by 286 days.

(21) Appl. No.: 13/436,716

(22) Filed: Mar. 30, 2012

Related U.S. Application Data

(60) Provisional application No. 61/470,030, filed on Mar. 31, 2011.

(51) Int. Cl.
*G06F 7/00* (2006.01)
*G06F 12/00* (2006.01)
*G06F 17/30* (2006.01)
*G06Q 10/00* (2012.01)
*G06Q 40/00* (2012.01)
*G06Q 50/00* (2012.01)

(52) U.S. Cl.
CPC *G06F 7/00* (2013.01); *G06F 12/00* (2013.01); *G06Q 10/00* (2013.01); *G06Q 50/00* (2013.01); *G06F 17/30* (2013.01); *G06Q 40/00* (2013.01)
USPC .......... 707/770; 707/769; 707/781; 707/792; 707/825; 705/2; 705/3

(58) Field of Classification Search
None
See application file for complete search history.

(56) References Cited

U.S. PATENT DOCUMENTS

| 5,963,625 | A | * | 10/1999 | Kawecki et al. | 379/127.01 |
|---|---|---|---|---|---|
| 5,974,406 | A | * | 10/1999 | Bisdikian et al. | 1/1 |
| 6,611,846 | B1 | * | 8/2003 | Stoodley | 707/740 |
| 6,915,265 | B1 | * | 7/2005 | Johnson | 705/2 |
| 6,980,962 | B1 | * | 12/2005 | Arganbright et al. | 705/14.31 |
| 7,505,919 | B2 | * | 3/2009 | Richardson | 705/7.14 |
| 7,519,558 | B2 | * | 4/2009 | Ballard et al. | 705/50 |
| 8,024,246 | B2 | * | 9/2011 | Alderman et al. | 705/36 R |
| 8,332,813 | B2 | * | 12/2012 | Arsanjani et al. | 717/110 |
| 8,666,799 | B1 | * | 3/2014 | Good et al. | 705/7.34 |
| 2002/0103932 | A1 | * | 8/2002 | Bilbrey et al. | 709/245 |
| 2004/0002924 | A1 | * | 1/2004 | Boone et al. | 705/400 |
| 2004/0024614 | A1 | * | 2/2004 | Alexander et al. | 705/2 |
| 2004/0078216 | A1 | * | 4/2004 | Toto | 705/2 |
| 2004/0078236 | A1 | * | 4/2004 | Stoodley et al. | 705/2 |
| 2004/0193441 | A1 | * | 9/2004 | Altieri | 705/1 |
| 2005/0187797 | A1 | * | 8/2005 | Johnson | 705/3 |
| 2005/0216448 | A1 | * | 9/2005 | Talib et al. | 707/3 |
| 2005/0228817 | A1 | * | 10/2005 | Hochberg et al. | 707/102 |
| 2005/0267782 | A1 | * | 12/2005 | Zahlmann et al. | 705/3 |
| 2005/0277474 | A1 | * | 12/2005 | Barry | 463/42 |
| 2006/0122870 | A1 | * | 6/2006 | Austin et al. | 705/3 |
| 2006/0161456 | A1 | * | 7/2006 | Baker et al. | 705/2 |
| 2006/0229916 | A1 | * | 10/2006 | Michelson et al. | 705/2 |

(Continued)

*Primary Examiner* — Gregory Johnson
(74) *Attorney, Agent, or Firm* — Patent Law Works LLP

(57) ABSTRACT

A system and method for coordinating and improving communication using a sponsored registry are disclosed. In one embodiment, the system includes a client search module and a client info retrieval module. The client search module receives a search request from a first provider including one or more search parameters associated with a client, searches one or more distributed sponsored databases based on the one or more search parameters, obtains search results from the one or more distributed sponsored databases including a search result associated with the client, wherein any particular client is sponsored by one sponsored database at most, and sends the search results for display to the first provider. The client info retrieval module receives a request for the client's data and information including the selection of the client from the search results and retrieves the client's data and information from the sponsored database.

20 Claims, 7 Drawing Sheets

(56) References Cited

U.S. PATENT DOCUMENTS

| | | | |
|---|---|---|---|
| 2007/0033070 A1* | 2/2007 | Beck et al. | 705/2 |
| 2007/0116036 A1* | 5/2007 | Moore | 370/462 |
| 2008/0033744 A1* | 2/2008 | Jones | 705/1 |
| 2008/0154099 A1* | 6/2008 | Aspel et al. | 600/301 |
| 2008/0256128 A1* | 10/2008 | Pierce et al. | 707/104.1 |
| 2009/0043612 A1* | 2/2009 | Szela et al. | 705/3 |
| 2009/0099921 A1* | 4/2009 | Klein et al. | 705/14 |
| 2009/0164243 A1* | 6/2009 | Zubak et al. | 705/2 |
| 2009/0172773 A1* | 7/2009 | Moore | 726/1 |
| 2009/0327006 A1* | 12/2009 | Hansan et al. | 705/7 |
| 2010/0017222 A1* | 1/2010 | Yeluri et al. | 705/2 |
| 2010/0023870 A1* | 1/2010 | Baker | 715/742 |
| 2010/0131498 A1* | 5/2010 | Linthicum et al. | 707/722 |
| 2010/0250285 A1* | 9/2010 | Shelton | 705/3 |
| 2011/0015941 A1* | 1/2011 | Backhaus | 705/2 |
| 2011/0125527 A1* | 5/2011 | Nair | 705/3 |
| 2011/0125528 A1* | 5/2011 | Padate et al. | 705/3 |
| 2011/0145593 A1* | 6/2011 | Auradkar et al. | 713/189 |
| 2011/0166872 A1* | 7/2011 | Cervenka et al. | 705/2 |
| 2011/0202370 A1* | 8/2011 | Green et al. | 705/3 |
| 2011/0264466 A1* | 10/2011 | Green et al. | 705/3 |
| 2011/0264550 A1* | 10/2011 | Fair | 705/26.2 |
| 2011/0287748 A1* | 11/2011 | Angel et al. | 455/414.1 |
| 2011/0301977 A1* | 12/2011 | Belcher et al. | 705/3 |
| 2011/0301982 A1* | 12/2011 | Green et al. | 705/3 |
| 2012/0059668 A1* | 3/2012 | Baldock et al. | 705/3 |
| 2012/0156664 A1* | 6/2012 | Hurwitz et al. | 434/262 |
| 2012/0192253 A1* | 7/2012 | Betsch et al. | 726/4 |
| 2012/0239560 A1* | 9/2012 | Pourfallah et al. | 705/40 |
| 2013/0041686 A1* | 2/2013 | Prywes | 705/3 |
| 2014/0142961 A1* | 5/2014 | Luter et al. | 705/2 |
| 2014/0244309 A1* | 8/2014 | Francois | 705/3 |

\* cited by examiner

SPONSORED REGISTRY FOR IMPROVED COORDINATION AND COMMUNICATION

CROSS REFERENCE TO RELATED APPLICATIONS

This application claims the benefit under 35 U.S.C. §119 (e) of U.S. Provisional Application No. 61/470,030, entitled "Sponsored Registries: A method for coordinating and improving communications between social service providers and their clients" filed Mar. 31, 2011, the entire contents of which are herein incorporated by reference.

BACKGROUND

1. Field of the Invention

The specification relates to coordinating and improving communication between a service provider and one or more of a client and another service provider. Specifically, the specification relates to coordinating and improving communication using a sponsored registry.

2. Description of the Related Art

Doctors, social workers, and other service providers spend significant time and energy communicating with clients. For example, clinics, family assistance programs, and most other social service providers maintain their own client contact information. Oftentimes organizations dedicate significant staff time to collecting and maintaining this information. Typically, a portion of each interaction with a client is used to collect and confirm client information including items such as name, birth date, address, insurance information, phone number, etc. Despite their best efforts, these databases often contain erroneous, out of date, or missing fields that hamper the organization's ability to effectively communicate with and serve clients. Delays and errors due to missed calls, unavailable or incorrect contact information, and communication delays reduce the quality of care, cost providers money and put clients at risk. Furthermore, these systems typically lack information that may be very important to delivering quality care, such as a list of related services utilized by a given client.

Current systems fail to enhance client communications, reduce errors and save staff time and effort. A first problem is that current systems do not provide a common point of contact with a client. A second problem is that current systems lack a credit tracking mechanism to incentivize maintaining accurate information. A third problem is that current systems do not allow providers to initiate communication with clients via the clients preferred medium and guarantee timely, auditable delivery of information to clients. A fourth problem is that current systems do not allow multiple providers to coordinate care. A fifth problem is that current systems do not allow providers to mark or tag interactions with clients.

SUMMARY

The specification overcomes the deficiencies and limitations of the prior art at least in part by providing a system and method for coordinating and improving communication using a sponsored registry.

In some examples, the specification describes a system and method for coordinating and improving communication using a sponsored registry. In one example, the system comprises a client search module and a client info retrieval module. The client search module receives a search request from a first provider including one or more search parameters associated with a client, searches one or more distributed sponsored databases based on the one or more search parameters, obtains search results from the one or more distributed sponsored databases including a search result associated with the client, wherein any particular client is sponsored by one sponsored database at most, and sends the search results for display to the first provider. In one example, the one or more search parameters are one or more client identifiers. In one example, searching the one or more distributed sponsored databases uses a cache of sponsor-client information.

The client info retrieval module receives a request for the client's data and information, the request including the selection of the client from the search results, and retrieves the client's data and information from the sponsored database storing the client's data and information. In one example, the retrieval of the client's data and information is subject to receiving the client's consent.

In some embodiments, the system includes an optional accounting module for debiting an account of the first provider a first amount responsive to the retrieval of the client's data and information and crediting an account of a sponsoring provider associated with the sponsored database from which the client data and information is retrieved a second amount responsive to the retrieval of the client's data and information. In one example, the first amount and second amount are equal.

In some embodiments, the system includes an optional update module for receiving updating information updating the client's data and information from the first provider and for sending the updating information to a sponsoring provider associated with the sponsored database from which the client's data and information was obtained to update the client's data and information in the sponsored database. In one example, the client's data and information is updated in the sponsored database subject to approval of the sponsoring provider.

In some embodiments, the system includes an optional interaction module operable to send a request for consent to the client and retrieve the client's data and information based at least in part on a response received from the client. In one example, the request for consent is sent using the client's preferred contact method. In one example, an interaction module sends a communication to one or more of the client, the first provider and another provider, the communication sent by a sponsored registry server.

In some embodiments, the system includes an optional audit module operable to create an audit trail including the communication. In one example, the audit trail may be tagged by the first provider. In some embodiments, the system includes an optional client/provider module to receive one or more indicators rating the performance of the client and calculate an overall score for the client.

The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The embodiments are illustrated by way of example, and not by way of limitation in the figures of the accompanying drawings in which like reference numerals are used to refer to similar elements.

DETAILED DESCRIPTION

Figure 1:
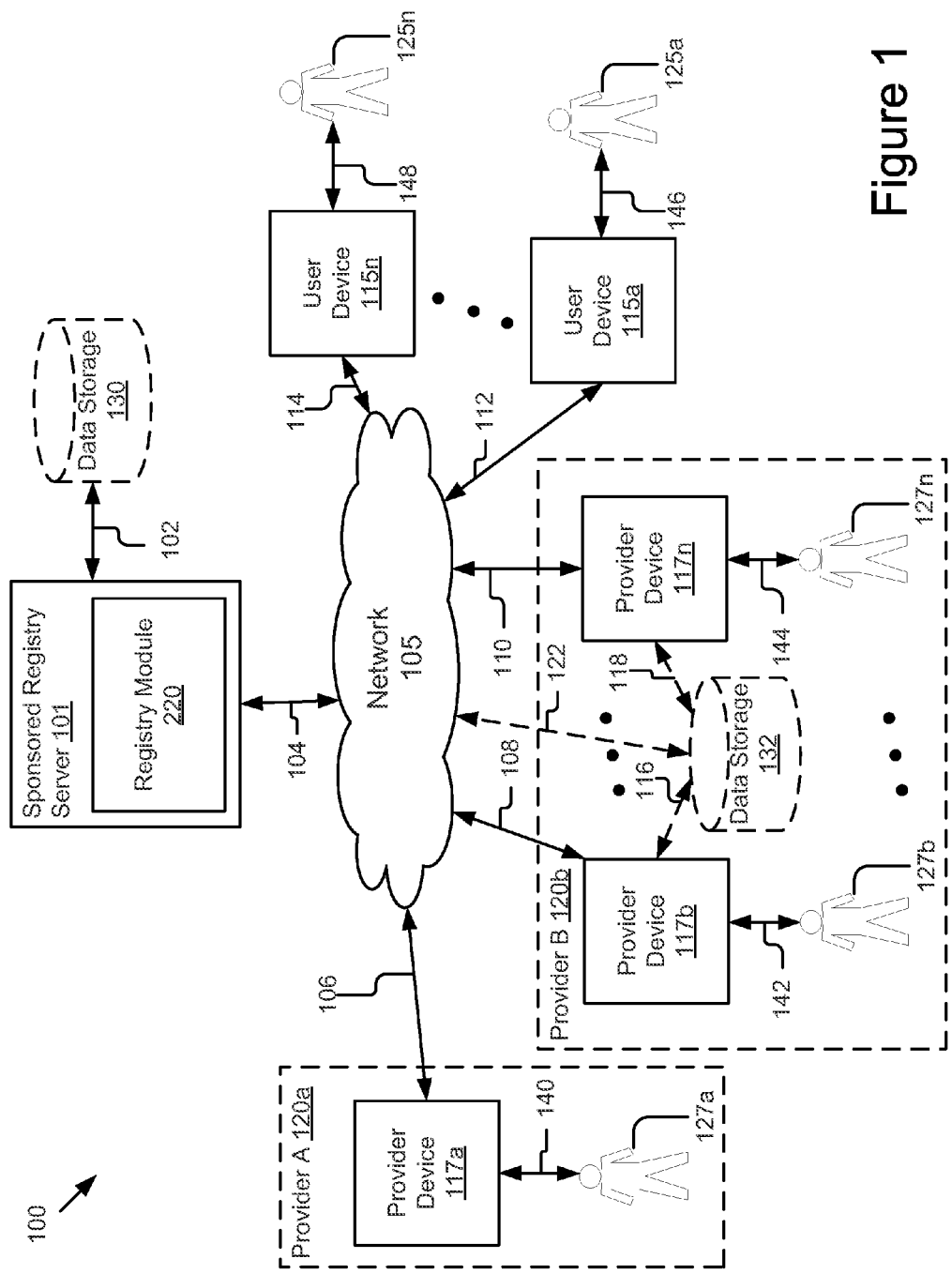
FIG. 1 illustrates a system for coordinating and improving communication using a sponsored registry according to one embodiment.

A system and method for coordinating and improving communication using a sponsored registry are described. In the following description, for purposes of explanation, numerous specific details are set forth in order to provide a thorough understanding of the embodiments. It will be apparent, however, to one skilled in the art that the embodiments can be practiced without these specific details. In other instances, structures and devices are shown in block diagram form in order to avoid obscuring the embodiments. For example, one embodiment is described below with reference to user interfaces and particular hardware. However, the present embodiments apply to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including, for example, "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The embodiments can take the form of an entirely hardware embodiment, an entirely software embodiment or an embodiment containing both hardware and software elements. An exemplary embodiment is implemented in software, which includes but is not limited to firmware, resident software, microcode, etc.

Furthermore, the embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

System Overview

FIG. 1 illustrates a block diagram of a system 100 for coordinating and improving communication using a sponsored registry according to one embodiment. The illustrated system 100 includes user devices 115a and 115n (also referred to collectively as user devices 115 or individually as user device 115) that are accessed by users 125a, 125b, and 125n (also referred to collectively as clients 125 or individually as client 125), a sponsored registry server 101 and providers 120a and 120b (also referred to collectively as providers 120 or individually as provider 120). In the illustrated embodiment, these entities are communicatively coupled via a network 105. Although only two user devices 115 are illustrated, any number of user devices 115 are available to any number of users 125.

The user devices 115 in FIG. 1 are used by way of example. While FIG. 1 illustrates two user devices 115, the present specification applies to any system architecture having any number of user devices 115. Furthermore, while only one network 105 is coupled to the user devices 115, the sponsored registry server 101 and the providers 120, in practice any number of networks 105 can be connected to the entities.

The providers 120 in FIG. 1 are used by way of example. While FIG. 1 illustrates two providers, the present specification applies to any system architecture having two or more providers. In one embodiment, a provider comprises one or more provider devices 117 (also referred to collectively as provider devices 117 or individually as provider device 117) that are accessed by users 127a, 127b, and 127n (also referred to collectively or individually as staff 127) and are communicatively coupled to the network 105. Although only three provider devices 117 are illustrated, any number of provider devices 117 are available to any number of staff 127. For simplicity and clarity, one or more of the provider devices 117 associated with a provider 120 communicating or being communicatively coupled is occasionally described herein as the provider 120 communicating or being communicatively coupled, respectively. For example, provider device 117a is communicatively coupled to the network 105 to communicate with the sponsored registry server 101, may be described as Provider A 120a is communicatively coupled to the network 105 to communicate with the sponsored registry server 101.

Although only one sponsored registry server 101 is shown, it will be recognized that multiple sponsored registry servers 101 may be present. In one embodiment, a registry module 220 is included in the sponsored registry server 101 and is operable on the sponsored registry server 101, which is connected to the network 105 via signal line 104. In some embodiments the registry module 220 includes multiple, distributed modules that cooperate with each other to perform the functions described below. Details describing the functionality and components of the registry module 220 are explained in further detail below with regard to FIG. 3.

The network 105 enables communications between user devices 115, the sponsored registry server 101 and the providers 120. Thus, the network 105 can include links using technologies including, for example, Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies, for example, the secure sockets layer (SSL), Secure HTTP and/or virtual private networks (VPNs) or Internet Protocol security (IPsec). In another embodiment, the entities can use custom and/or dedicated data communications technologies instead of, or in addition to, the ones described above. Depending upon the embodiment, the network 105 can also include links to other networks.

In one embodiment, the network 105 is a partially public or a wholly public network, for example, the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wireline or wireless (i.e., terrestrial or satellite-based transceivers). In one embodiment, the network 105 is an IP-based wide or metropolitan area network.

In the illustrated embodiment, the user devices 115a and 115n are coupled to the network 105 via signal lines 112 and 114, respectively. The user 125a can interact with the user device 115a as illustrated by signal line 146. Similarly, the user 125n can interact with the user device 115n as illustrated by signal line 148. The provider devices 117a, 117b and 117n are coupled to the network 105 via signal lines 106, 108 and 110, respectively. The user 127a can interact with the user device 117a as illustrated by signal line 140. Similarly, the user 127b can interact with the user device 117b as illustrated by signal line 142, and the user 127n can interact with the user device 117n as illustrated by signal line 144. In one embodiment, a provider 120 includes a data storage 132, which users 127 can access using a provider device 117 directly, as illustrated by signal lines 116 and 118, or indirectly via the network 105 as illustrated by signal line 122 (depending on the embodiment). The sponsored registry server 101 is communicatively coupled to the network 105 via signal line 104. In one embodiment, the sponsored registry server 101 is communicatively coupled to data storage 130 via signal line 102.

In one embodiment, the data storage 132 stores client data and information associated with clients of the provider associated with the data storage (i.e. provider 120b). In one embodiment, the stored client data and information includes one or more client identifiers. Examples of client identifiers include, but are not limited to, one or more of name, phone number(s), date of birth (DOB), mailing address, billing address, permanent address, e-mail address, client number, social security number (SSN), driver's license number, insurance policy number, etc. In one embodiment, the information stored in data storage 132 also includes information commonly required by providers. Examples of information commonly required by providers include, but are not limited to, one or more of a user's insurance information, medication allergies, chronic or pre-existing conditions, current medication regiments, etc. In one embodiment, which is discussed below, a storage device 214 (see FIG. 2) is included in one or more provider devices 117 (i.e., a computing device 200) and the storage device 214 stores the client data and information. Occasionally, the storage device 214 and/or the data storage 132 storing client data and information are referred to as a "database" or "client database." In some embodiments, the provider 120 may sponsor a client, which is discussed in reference to FIG. 3. When a provider sponsors a client, the provider's storage device 214 and/or data storage 132 are occasionally referred to as a "sponsored database" and the provider is occasionally referred to as the "sponsoring provider."

In one embodiment, the data storage 130 stores data and information associated with sponsored registry server 101 and its functionality. In one embodiment, the sponsored registry server 101 does not aggregate client data and information from multiple service providers and store the aggregated data. In one embodiment, the data and information associated with the sponsored registry and its functionality includes provider information, which may be used, for example, to verify a provider or staff member at login. In one embodiment, the data and information associated with the sponsored registry and its functionality includes sponsor-client information, which may, for example, be useful for facilitating searches of the sponsored databases distributed in the system 100. In one embodiment, the data and information associated with the sponsored registry and its functionality includes client and/or provider ratings, which may be used, for example, to evaluate the performance and/or compliance of providers and/or clients. In one embodiment, the data and information associated with the sponsored registry and its functionality includes an audit trail, which may be used, for example, to audit communications between a provider and one or more of a client and another provider. In one embodiment, the data and information associated with the sponsored registry and its functionality includes account records, which may be used, for example, to track the debiting and crediting of credits to incentivize maintenance and sharing of clients' data and information within the system 100. In one embodiment, which is discussed below, a storage device 214 (see FIG. 2) is included in the sponsored registry server 101 (i.e., a computing device 200) and the storage device 214 stores the data and information associated with the sponsored registry and its functionality.

In one embodiment, one or more of the user device 115 and the provider device 117 are an electronic device having a web browser (not shown) for interacting with the sponsored registry server 101 of the system 100 via the network 105. One or more of the user device 115 and provider device 117 can be, for example, a laptop computer, a desktop computer, a tablet computer, a mobile telephone, a personal digital assistant (PDA), a mobile email device, a portable game player, a portable music player or any other electronic device capable of accessing a network. One having ordinary skill in the art will recognize that other types of devices 115 and 117 are possible. In one embodiment, the system 100 comprises a combination of different types of client devices 115 and 117. For example, a combination of a personal computer, a mobile phone and a tablet computer. The users 125 and 127 are human users of devices 115 and 117, respectively.

Computing Device 200

Figure 2:
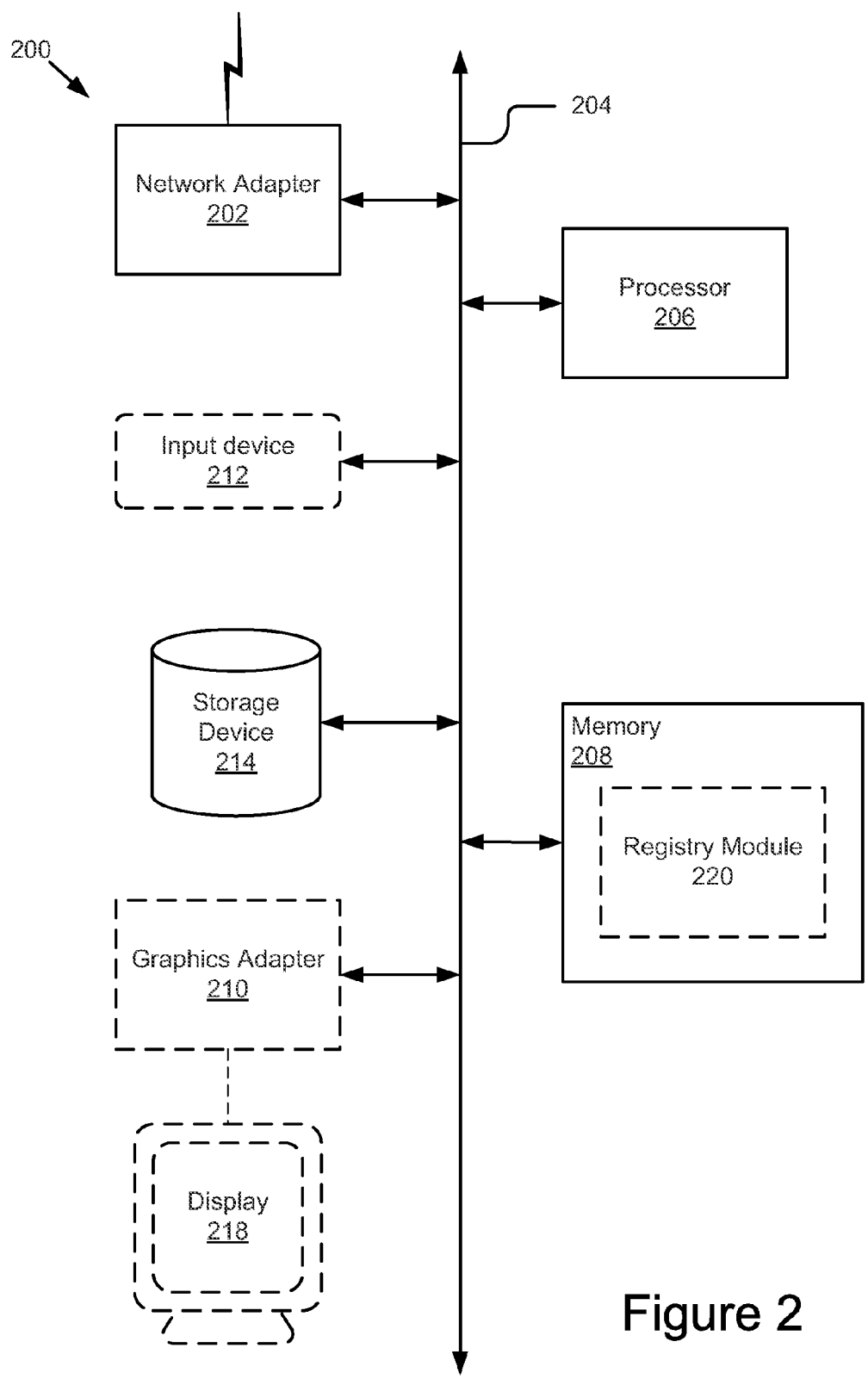
FIG. 2 is a block diagram illustrating a computing device according to one embodiment.

FIG. 2 is a block diagram of a computing device 200 according to one embodiment. As illustrated in FIG. 2, the computing device 200 includes a network adapter 202 coupled to a bus 204. According to one embodiment, also coupled to the bus 204 are at least one processor 206, a memory 208, a graphics adapter 210, an input device 212 and a storage device 214. In one embodiment, the memory 208 comprises a registry module 220. In one embodiment, the functionality of the bus 204 is provided by an interconnecting chipset. The computing device 200 also includes a display 218, which is coupled to the graphics adapter 210.

The processor 206 may be any general-purpose processor. The processor 206 comprises an arithmetic logic unit, a microprocessor, a general purpose controller or some other processor array to perform computations and execute code and routines. The processor 206 is coupled to the bus 204 for communication with the other components of the computing device 200. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. The computing device 200 also includes an operating system executable by the processor including but not limited to WINDOWS®, MacOS X, Android or UNIX® based operating systems. It will be obvious to one skilled in the art that other processors, operating systems, sensors, displays and physical configurations are possible.

The memory 208 is a non-transitory storage medium. The memory 208 holds instructions and/or data that may be executed by the processor 206. In one embodiment, the instructions and/or data stored on the memory 208 comprise code for performing any and/or all of the techniques described herein. The memory 208 may be a dynamic random access memory (DRAM) device, a static random access memory (SRAM) device, flash memory or some other memory device known in the art. In one embodiment, the memory 208 also includes a non-volatile memory or similar permanent storage device and media, for example, a hard disk drive, a floppy disk drive, a CD-ROM device, a DVD-ROM device, a DVD-RAM device, a DVD-RW device, a flash memory device, or some other mass storage device known in the art for storing information on a more permanent basis. The memory 208 is coupled by the bus 204 for communication with the other components of the computing device 200. In one embodiment, the computing device 200 is a sponsored registry server 101 and the registry module 220 is stored in memory 208 and executable by the processor 206.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 208 and comprises one or more devices including a hard disk drive, a floppy disk drive, a CD-ROM device, a DVD-ROM device, a DVD-RAM device, a DVD-RW device, a flash memory device, or some other mass storage device known in the art. In one embodiment, the computing device 200 is a provider device 117. In one such embodiment, the storage device 214 stores client data and information. For example, the client data and information discussed above in reference to data storage 132. In one embodiment, the computing device 200 is a sponsored registry server 101. In one such embodiment, the storage device 214 stores data and information associated with the sponsored registry and its functionality. For example, the data and information associated with the sponsored registry and its functionality discussed above in reference to data storage 130.

The input device 212 may include a mouse, track ball, or other type of pointing device to input data into the computing device 200. The input device 212 may also include a keyboard, for example, a QWERTY keyboard or any other physical or soft keyboard in any language. The input device 212 may also include a microphone, a web camera or similar audio or video capture device. The graphics adapter 210 displays images and other information on the display 218. The display 218 is a conventional type, for example, a liquid crystal display (LCD) or any other similarly equipped display device, screen, touchscreen or monitor. The display 218 represents any device equipped to display electronic images and data as described herein. The network adapter 202 couples the computing device 200 to a local or wide area network.

The registry module 220 is code and routines executable by the processor 206 for coordinating and improving communication using a sponsored registry. In one embodiment, the registry module 220 is a set of instructions executable by the processor 206. In another embodiment, the registry module 220 is stored in the memory 208 and is accessible and executable by the processor 206. Details describing the functionality and components of the registry module 220 are explained in further detail below in reference to FIG. 3.

As is known in the art, a computing device 200 can have different and/or other components than those shown in FIG. 2. For example, the computing device can have speakers or another form of audio output. In addition, the computing device 200 can lack certain illustrated components. For example, in one embodiment, the computing device 200 is a sponsored registry server 101 and lacks an input device 212, graphics adapter 210 and/or display 218. Moreover, the storage device 214 can be local and/or remote from the computing device 200 (e.g., a storage area network (SAN)).

As is known in the art, the computing device 200 is adapted to execute computer program modules for providing the functionality described herein. As used herein, the term "module" refers to computer program logic utilized to provide the specified functionality. Thus, a module can be implemented in hardware, firmware, and/or software. In one embodiment, program modules are stored on the storage device 214, loaded into the memory 208 and executed by the processor 206.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Registry Module 220

Figure 3:
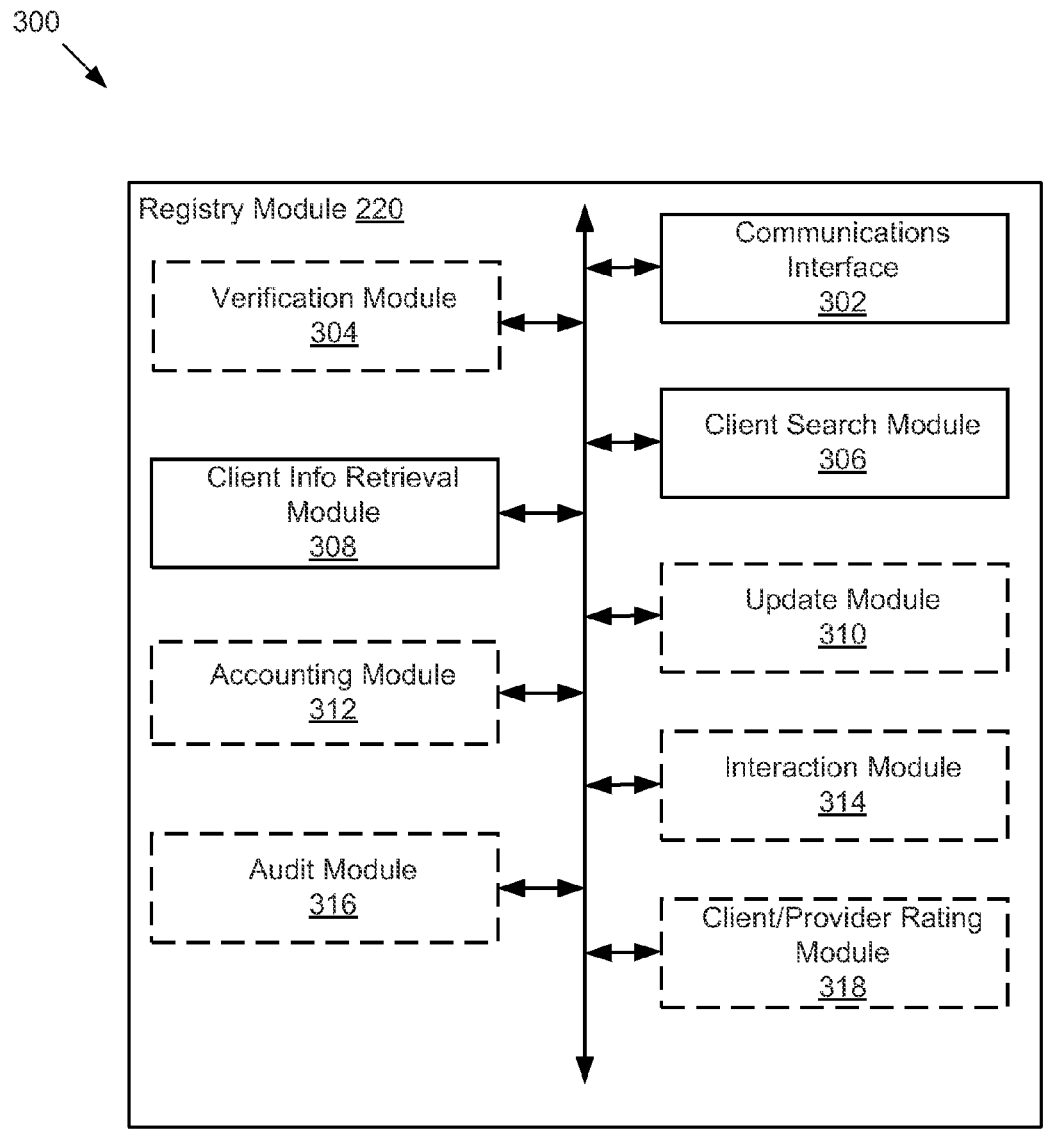
FIG. 3 is a block diagram illustrating a registry module according to one embodiment.

Referring now to FIG. 3, the registry module 220 is shown in more detail. FIG. 3 is a block diagram of the registry module 220 included in a sponsored registry server 101.

In one embodiment, the registry module 220 comprises a communications interface 302, an optional verification module 304, a client search module 306, a client info retrieval module 308, an update module 310, an optional accounting module 312, an optional interaction module 314, an optional audit module 316 and an optional client/provider rating module 318.

It will be recognized that the modules 302, 304, 306, 308, 310, 312, 314, 316, 318 comprised in the registry module 220 are not necessarily all on the same computing device 200. In one embodiment, the modules 302, 304, 306, 308, 310, 312, 314, 316, 318 are distributed across multiple computing devices 200. For example, in one embodiment, the modules 302, 304, 306, 308, 310, 312, 314, 316, 318 are distributed across multiple sponsored registry servers 101. It will be recognized that the preceding is just an example of distributing modules across multiple computing devices 200 and that other examples exist.

The communication interface 302 is code and routines for handling communications between the verification module 304, the client search module 306, the client info retrieval module 308, the update module 310, the accounting module 312, the interaction module 314, the audit module 316, the client/provider rating module 318 and other components of the sponsored registry server 101. In one embodiment, the communication interface 302 is a set of instructions executable by the processor 206. In another embodiment, the communication interface 302 is stored in the memory 208 and is accessible and executable by the processor 206. In either embodiment, the communication interface 302 is adapted for cooperation and communication with the processor 206, other components of the computing device 200 and other components of the registry module 220.

The communication interface 302 handles communications between the verification module 304, the client search module 306, the client info retrieval module 308, the update module 310, the accounting module 312, the interaction module 314, the audit module 316, the client/provider rating module 318 and other components of the computing device 200. For example, in one embodiment, the communication interface 202 communicates with the client info retrieval module 308 and the accounting module 312 to pass an information retrieval signal to the accounting module 312. However, this description may occasionally omit mention of the communication interface 302 for purposes of clarity and convenience. For example, for purposes of clarity and convenience, the above scenario may be described as the client info retrieval module 308 passing a data retrieval signal to the accounting module 312.

The optional verification module 304 is code and routines for authorizing access to the features and functionality of the sponsored registry server 101. In one embodiment, the verification module 304 is a set of instructions executable by the processor 206. In another embodiment, the verification module 304 is stored in the memory 208 and is accessible and executable by the processor 206. In either embodiment, the verification module 304 is adapted for cooperation and communication with the processor 206, other components of the sponsored registry server 101, the registry module 220 and the system 100.

The verification module 304 authorizes access to the sponsored registry server 101 and its features and functionality. In some embodiments, one or more of the features and functionality of the sponsored registry server 101 are accessible subject to authorization. In one embodiment, authorization is based at least in part on a provider identifier. For example, a provider may be associated with one or more provider identifiers subject to one or more of registering, paying a subscription and proving that the provider is a provider and not some other type of user (e.g. an unwanted marketer) to use one or more of the features and functionality.

In one embodiment, verification module 304 authorizes access to the features and functionality of the sponsored registry server 101 upon authentication of the provider 120 and/or staff member 127. In one embodiment, the verification module 304 authenticates the provider 120 and/or the staff member 127 at login. For example, the verification module 304 receives a provider identifier from one or more of the provider 120 and the staff member 127. Provider identifiers may be based at least in part on one or more of what the staff member 127 knows (e.g., a password), what the staff member 127 is (e.g., biometric information), what the provider 120 is (e.g. provider device number and/or IP address) and what the staff member 127 possesses (e.g., a magnetic swipe badge). Examples of provider identifiers include but are not limited to a user name and/or password, a user alias, e-mail address, a biometric identifier (e.g., finger print, voice print, retina scan, DNA, etc.), an electronic identifier (e.g., magnetic badge swipe, etc.) or anything else capable of identifying a provider 120 and/or staff 127. In one embodiment, the verification module 304 compares the received provider identifier(s) to stored provider identifiers (e.g. stored in the storage device 214 of the sponsored registry server 101) and authorizes access if a match is found.

In some embodiments, the verification module 304 performs a secondary authentication. For example, responsive to receiving a staff member's correct username and password, the verification module 304 retrieves the staff member's phone number and/or e-mail and sends a short message service (SMS) text message and/or e-mail containing an authorization code to the staff member 127. The verification module 304 verifies the staff member 127 responsive to the staff member entering the authentication code into a provider device 117. It will be recognized that the preceding is just an example of a secondary authorization and that other examples exist.

In one embodiment, authorization is based at least in part on an authentication token. For example, responsive to authenticating the provider 120 and/or staff member 127, the verification module 304 provides an authentication token that permits the provider 120 and/or staff member 127 to access the features and functionality of the sponsored registry server 101. It will be recognized that the preceding is just an example of authorization and that other examples exist.

In one embodiment, the verification module 304 passes authorization to one or more modules of the registry module 220 (e.g. the client search module 306) authorizing the functionality performed by that module. For example, the verification module 304 is communicatively coupled to the client search module 306 to send the authorization to the client search module 306, thereby authorizing the provider to utilize the sponsored registry server's search functionality. In another embodiment, the verification module 304 (or the communication interface 302) stores the authorization in the storage device 214 (or any other non-transitory storage medium communicatively accessible) of the sponsored registry server 101. The other modules of the registry module 220 including the client search module 306 can retrieve the authorization by accessing the storage device 214 (or other non-transitory storage medium) of the sponsored registry server 101.

The client search module 306 is code and routines for receiving a client search request, coordinating the search of sponsored databases and providing a list of clients matching the search request. In one embodiment, the client search module 306 is a set of instructions executable by the processor 206. In another embodiment, the client search module 306 is stored in the memory 208 and is accessible and executable by the processor 206. In either embodiment, the client search module 306 is adapted for cooperation and communication with the processor 206, other components of the sponsored registry server 101, the registry module 220 and the system 100.

The client search module 306 receives a client search request from a provider 120. A client search request includes one or more search parameters, for example, one or more client identifiers. Examples of client identifiers include but are not limited to name, phone number(s), date of birth (DOB), mailing address, billing address, permanent address, e-mail address, client number (assigned by one or more of a first provider 120 and the sponsored registry server 101 depending upon the embodiment), social security number (SSN), driver's license number, insurance policy number, etc. For example, in one embodiment, a client 125 provides a staff member 127 with the client's name, DOB and/or phone number, which the staff member 127 enters into a search box displayed on a provider device 117. The staff member then presses a key or selects a graphical user interface (GUI) button using an input device 212 to request a search, which is received by the client search module 306.

The client search module 306 coordinates the search of one or more sponsored databases based at least in part on the search request. The client search module 306 does not directly search the one or more sponsored databases. In one embodiment, the client search module 306 coordinates the search of one or more sponsored databases by establishing a communications link with the one or more of the sponsored databases, placing one or more parameters from a search request in a queue to be sent, via the communications link, to the one or more sponsored databases. The one or more sponsored databases responsive to receiving the one or more parameters perform the search and return potential matches to the client search module 306 of the sponsored registry server 101. In one embodiment, the client search module 306 aggregates the potential matches received from the one or more sponsored databases and returns an aggregated list of potential matches, occasionally referred to herein as "search results," to the requesting provider.

In one embodiment, a sponsored database is a provider's database storing client data and information that is searchable by other providers using the sponsored registry server 101 (e.g., via the client search module 306) and allows the retrieval of client data and information by other providers (e.g., via the client info retrieval module 308 discussed below). For example, assume provider A's client database (e.g. stored on the storage device 214 of provider device 117*a*) is searchable by provider B via client search module 306 and client data and information from a search result may be obtained by the provider B, in one embodiment, provider A's client database is a sponsored database.

In some embodiments, each provider 120 of the system 100 includes a sponsored database. For example, a provider is not permitted to join and use the system 100 unless the provider configures its database(s) to enable the search and retrieval of client information from its database(s) by other providers. In some embodiments, the system 100 may include providers that have a sponsored database and providers that do not have a sponsored database. For example, assume provider B's database permits searches by provider A 120*a* via the client search module 306 or retrieval of client data and information (i.e. is a sponsored database). Also, assume that provider A 120*a* does not want to share its client data and information, so its database does not permit searches by provider B 120*b* via the client search module 306 or retrieval of client data information (i.e. is not a sponsored database). In one embodiment, provider B's database is a sponsored database and provider A's database is not a sponsored database.

In one embodiment, data and information of a client may be stored by multiple providers 120; however, only one provider 120 is the sponsoring provider 120. In one embodiment, the sponsoring provider is a provider 120 associated with a sponsored database that stores the client's data and is responsible for and (in some embodiments) compensated for verifying and maintaining the client's information. For example, the sponsoring provider ensures that the client's contact information, primary insurance information, etc. is up-to-date and available for search and retrieval by other providers.

In one embodiment, a provider must have a minimum set of required data and information for a client on a sponsored database to be a sponsoring provider of that client. For example, the provider must have client A's name, phone number, billing address and DOB stored in a sponsored database to be client A's sponsoring provider. In one embodiment, the sponsoring provider is the provider 120 that is first in time.

For example, assume provider A 120a is the first provider 120 to join the system 100 with a sponsored database including Client A's data and information, in one embodiment, provider A 120a is Client A's sponsoring provider. In one embodiment, the sponsoring provider is subject to change. In one such embodiment, a client 125 may change or request the change of his/her sponsoring provider (e.g. using a user device 115 or via a provider 120). For example, assume a client's first sponsoring provider is a former healthcare provider which the client no longer uses. In one embodiment, the client 125 may change the sponsoring provider to the client's current healthcare provider. It will be recognized that the preceding are merely examples of determining/assigning a sponsoring provider and that other examples exist.

Although the client search module 306 does not directly search the one or more sponsored databases, in one embodiment, the client search module 306 performs a pre-search. In one embodiment, the client search module 306 performs a pre-search using a cache of sponsor-client information. In one embodiment, the sponsored registry server 101 includes (e.g. stored on the storage device 214) a cache of sponsor-client information. In one embodiment, the sponsor-client information includes a subset of client data and information for each client and the client's sponsoring database. For example, the subset of client data and information is a client number and the cache includes the ranges of client numbers associated with each sponsored database. In another example, the subset of client data and information is one or more client identifiers (e.g. last name), in one embodiment, the sponsor-client information includes a list of one or more client identifiers (i.e. last name) and the sponsoring database associated with the client. In one embodiment, the sponsor-client information may have the form XYZ@P123.com where "XYZ" is specific to one or more clients (e.g. last name) and "P123.com" is the registered domain of the sponsoring provider. It will be recognized that the preceding is merely an example of sponsor-client information and that other examples exist. It will be recognized that the preceding are merely examples of sponsor-client information and subsets of user data and information and that other examples exist.

In one embodiment, the pre-search using the cache of sponsor-client information is used to facilitate the coordination of the search one or more sponsored databases. For example, the sponsor-client information narrows the number of sponsored databases for which the client search module 306 queues the one or more search parameters to the sponsored databases that potentially contain the desired client. For example, assume the sponsor-client information includes ranges of client numbers associated with each sponsored database and that the search request included a client number, in one embodiment, the client search module 306 performs a pre-search and queues the one or more parameters from the search request for sending to the sponsored database associated with the client number range associated with the client number from the search request. That sponsored database performs the search and returns a potential match.

In another example, assume provider A is searching for a Jane Doe, provider B sponsors client Jon Doe, provider C sponsors client Jane Doe, and providers A and D-Z do not sponsor a client with the last name Doe. Also, assume the sponsor-client information includes a client's last name. In one embodiment, the client search module 306 may receive the search request from provider A including the name Jane Doe. The client search module 306 may perform a pre-search comparing the last name from the search request to the cached sponsor-client information (e.g. looks for sponsor-client information beginning with "Doe@"). The client search module 306 identifies the sponsored database(s) that may have a match, which are the sponsored databases of providers B and C in the example (e.g. by identifying the domains associated with those sponsored domains). The client search module 306 queues the one or more parameters from the search request for sending to the sponsored databases of providers B and C, which receive the one or more parameters and return one or more potential matches. In this example, the cache facilitated a more efficient search because the cache allowed the client search module 306 to determine that a search by the sponsored databases of providers A, D-Z was unnecessary and therefore did not queue the one or more parameters to be sent to those databases. It will be recognized that the preceding are merely examples of performing a pre-search using a cache of sponsor-client information to facilitate searching and that other examples exist. Moreover, it will be recognized that using a cache of sponsor-client information is merely an example of performing a pre-search and that other examples exist.

In one embodiment, the information returned for each potential match includes a limited set of client data and information. In one embodiment, the limited set of client information is the one or more search parameters of the search request. For example, assume a provider searches using name, date of birth (DOB) and phone number, in one embodiment, each potential match is limited to the name, DOB and phone number. Additional metadata, such as the date of the most recent update to the client information may also be returned. In another embodiment, the limited set of information includes additional information necessary for a provider to verify that a potential match is associated with the desired client. For example, assume, the client name's full name, DOB, phone number and e-mail address are sufficient to determine whether a potential match is associated with the desired client, in one embodiment, each potential match includes limited information including the client name's full name, DOB, phone number and e-mail address.

In one embodiment, each potential match is associated with a token and a sponsored database identifier. In one embodiment, the token is provided to the client search module 306 by the sponsored database that was searched and produced the potential match. For example, assume the sponsored database of provider A received search parameters, performed a search and identified a potential match, in one embodiment, the sponsored database of provider A associates a token with the potential match which is received by the client search module 306.

In one embodiment, the sponsored database maintains a database or listing that associates a token identifier with a specific client record. In one embodiment, the token includes information about the search request which generated this result. In one embodiment, the information embedded in the token includes an identifier or public key associated with the provider requesting the search. For example, the token may include a unique identifier used by the sponsoring provider to identify the client and his/her associated data and information within the sponsored database. In one embodiment, the token includes a network address, public key or other information identifying the sponsored database on which the potential match is located. For example, in one embodiment, the token may have a form similar to http://sponsora.com/query3/result27/0xabcd where "sponsora.com" is the sponsored database identifier, "query3" is a search request ID (discussed below), and "result27/0xabcd" identifies client data and information associated with the potential match. It will be recognized that the preceding are merely examples of tokens and a sponsored database identifier and other examples exist.

In one embodiment, the client search module 306 aggregates the potential matches received from the one or more sponsored databases and returns an aggregated list of potential matches, occasionally referred to herein as "search results," to the requesting provider. For example, in one embodiment, the one or more search parameters are queued with a search request ID. In one embodiment, the search request ID is a unique identifier. The one or more sponsored databases perform the search and return any potential matches along with the search request ID. The client search module 306 aggregates the potential matches from various sponsored databases associated with the same search request ID and sends the search results to the requesting provider.

In one embodiment, the client search module 306 formats the search results. In one embodiment, the search results are formatted into an ordered list. For example, the client search module 306 or sponsored database determines the degree of matching between the one or more search parameters and a potential match and the client search module 306 formats the search results so that clients having the highest degree of matching are listed first. In another example, assume sponsoring providers may receive compensation from a provider wishing to retrieve that client data and information in return for sponsoring that client data and information, in one such embodiment, the client search module 306 may order the search results based at least in part on the amount of compensation required for retrieving the client data and information associated with each search result. It will be recognized that the preceding are merely examples of ordered lists and that other examples exist.

In one embodiment, the list of potential matches may be formatted such that limited or specific fields are displayed to the staff member 127. For example, the fields displayed to the provider in the search results are limited to the fields used for searching. For example, if a provider searched using name, DOB and phone number, in one embodiment, the search results are formatted to only display name, DOB and phone number. In another example, the fields displayed to the provider in the search results are limited to the minimum fields necessary for a provider to verify that a result is actually associated with the desired client before the provider retrieves the client data and information. For example, the client name's full name, DOB, phone number and e-mail address are displayed for each client matching the search request. The requesting provider may use such information to determine which if any is associated with the desired client (e.g. by verbally verifying information with the client). It will be recognized that the preceding are merely examples of limited or specified fields and that other examples exist. In one embodiment, the fields matching the search request may be formatted to highlight the data that matches the search request. It will be recognized that the preceding are just examples of formatting and that other examples exist.

In one embodiment, the client search module 306 passes the search results to the provider 120. For example, the client search module 306 is communicatively coupled to a provider device 117 to send the search results to the provider device 117 for display. In another embodiment, the client search module 306 (or the communication interface 302) stores the search results in the storage device 214 (or any other non-transitory storage medium communicatively accessible) of the sponsored registry server 101. The devices of the system 100, for example, the provider device 117 that requested the search can retrieve the search results by accessing the storage device 214 (or other non-transitory storage medium) of the sponsored registry server 101.

The client info retrieval module 308 is code and routines for retrieving client information from a sponsoring provider. In one embodiment, the info editing module 308 is a set of instructions executable by the processor 206. In another embodiment, the info editing module 308 is stored in the memory 208 and is accessible and executable by the processor 206. In either embodiment, the info editing module 308 is adapted for cooperation and communication with the processor 206, other components of the sponsored registry server 101, the registry module 220 and the system 100.

The client info retrieval module 308 retrieves client data and information from a sponsored database of the sponsoring provider. In one embodiment, the client info retrieval module 308 retrieves client data and information responsive to receiving a request, which in one embodiment is a selection from a staff member 127 via a provider device 117 that selects a client from the search results. For example, a staff member 127 of a first provider requests client data and information by selecting a client from the search results by using an input device 212 of the provider device 117 to double click on a search result and the client info retrieval module 308 retrieves the data and information of the client associated with that search result from the sponsored database of the client's sponsoring provider.

In some embodiments, direct communication may be possible between one or more providers. For example, in some embodiments, a selection may be sent directly from a requesting provider to the sponsoring database and/or client data and information or a pointer thereto may be sent directly from a sponsored database to the requesting provider. However, in some embodiments, direct communication between one or more providers is not possible. For example, a requesting provider may not be able to directly send search parameters directly to one or more sponsored databases and/or receive client data and information directly from a sponsored database because of a firewall. In some embodiments, communications regardless of whether providers are capable of direct communication are channeled through the sponsored registry server 101. The channeling of all communications through the sponsored registry server 101 beneficially allows for accounting and auditing as described below in reference to the accounting module 312 and the audit module 314.

In one embodiment, the client info retrieval module 308 retrieves client data and information by importing the client data and information from the sponsoring database to the requesting provider's database. For example, the staff member 127 of a first provider selects a client from the search results and the client info retrieval module 308 receives the token associated with that selection and imports the data and information of the client associated with that token from the identified sponsored database of the client's sponsoring provider and stores it in the first client's local database (e.g. storage device 214).

In one embodiment, the client info retrieval module 308 retrieves client data and information by creating a pointer to the client's data and information. In one embodiment, the pointer allows a provider to access and/or use the client data and information without storing the client's data and information on its own database. For example, the staff member 127 of a first provider selects a client from the search results and the client info retrieval module 308 creates a pointer to the data and information of that client and stores the pointer in the first client's local database (e.g. storage device 214) in association with the client.

In one embodiment, the client info retrieval module 308 retrieves client data and information by prompting the sponsoring database to send one or more of the client data and information and a pointer to the requesting provider. For example, the staff member 127 of a first provider selects a client from the search results and the client info retrieval module 308 prompts the sponsoring database storing that client's data and information to send the client data and information or a pointer thereto (depending on the embodiment) for display to and/or storage by the first provider.

In one embodiment, the client info retrieval module 308 passes client data and information retrieved from the sponsoring provider to a requesting provider for display and/or storage. For example, the client info retrieval module 308 is communicatively coupled to the provider device 117 which stores the client data and information in a requesting provider's local database (e.g. the storage device 214 or any other non-transitory storage medium communicatively accessible). In one embodiment, the client info retrieval module 308 passes a pointer to a provider device 117 for storage by the provider device 117 for storage. For example, the client info retrieval module 308 is communicatively coupled to the provider device 117 which stores the client data and info in a provider's local database (e.g. in the storage device 214 or any other non-transitory storage medium communicatively accessible). In one embodiment, the client info retrieval module 308 passes a signal prompting a sponsoring database to send one or more of the client data and information and a pointer to the requesting provider. For example, the client info retrieval module 308 is communicatively coupled to the sponsoring provider (e.g. via a provider device 117) and transmits a signal to the sponsoring provider. The sponsoring provider communicatively coupled to the requesting provider to send one or more of the client data and information and the pointer to the requesting provider.

In some embodiments, the communications between one or more of the sponsored registry server 101, provider device 117 and the client device 115 are authenticated and/or encrypted. For example, a public/private key pair is used for encryption. In one embodiment, one or more of the communications is encrypted such that the sponsored registry server 101 does not have access to complete client data and information. For example, when retrieving the client data and information from the sponsoring register, the client info retrieval module 308 provides the sponsored database with the requesting provider's public key. The sponsored database uses the public key to encrypt the client's data and information before sending the client data and information to the requesting provider via the client info retrieval module 308 of the sponsored registry server 101. It will be recognized that a key pair is just one example of encryption and that other examples exist. It will further be recognized that the preceding is merely an example of a type of communication that may be encrypted from the sponsored registry server 101 and that other examples exist.

In one embodiment, the client info retrieval module 308 passes an information retrieval signal to the accounting module 312 when a request to retrieve information from a sponsored database is received. For example, the client info retrieval module 308 is communicatively coupled to the accounting module 312 to send the information retrieval signal to the accounting module 312. In another embodiment, the client info retrieval module 308 passes an information retrieval signal to the interaction module 314 when a request to retrieve information from a sponsored database is received. For example, the client info retrieval module 308 is communicatively coupled to the interaction module 314 to send the information retrieval signal to the interaction module 314. In another embodiment, the client info retrieval module 308 (or the communication interface 302) stores the information retrieval signal in the storage device 214 (or any other non-transitory storage medium communicatively accessible) of the sponsored registry server 101. The components of the registry module 220, for example, one or more of the accounting module 312 and the interaction module 314, can retrieve the information retrieval signal by accessing the storage device 214 (or other non-transitory storage medium) of the sponsored registry server 101.

The combination of the client search module 306 and the client info retrieval module 308 may beneficially reduce the data entry burdens of enrolling a new client. For example, assume the client has already been registered by a sponsoring provider and is now visiting a new provider. In one embodiment, the new provider does not need to provide forms for a client to fill out, type and/or scan in information from the forms once filled out, scan or copy documents (e.g. insurance card, driver's license, etc.). Instead, a staff member 127 of the new provider may use the system 100 to search distributed sponsored databases and locate client data and information (e.g. via the client search module 306) and retrieve the client data and information (e.g. via the client info retrieval module 308) that is maintained by a sponsoring provider, thereby eliminating the need for the new provider to collect and enter the client's data and information. In some embodiments, the new provider may still wish to collect and enter the client's data, for example, if the compensation required to retrieve the client's data and information is too high.

The update module 310 is code and routines for updating information within the system 100. In one embodiment, the update module 310 is a set of instructions executable by the processor 206. In another embodiment, the update module 310 is stored in the memory 208 and is accessible and executable by the processor 206. In either embodiment, the update module 310 is adapted for cooperation and communication with the processor 206, other components of the sponsored registry server 101, the registry module 220 and the system 100.

The update module 310 is code and routines for updating information within the system 100. In one embodiment, the update module 310 updates information in the system 100 related to the enrollment of a new client into the system 100. For example, in some embodiments, the update module 310 updates the cached sponsor-client information. In some embodiments, the cache of sponsor-client information is updated periodically (e.g. hourly) by the update module 310. In some embodiments, the cache of sponsor-client information is updated by the update module 310 based on one or more events (e.g. responsive to a new client being sponsored in the system and/or responsive to a change in sponsorship of a client).

In another example, in some embodiments, the update module 310 updates information related to the enrollment of a new client into the system 100 by assigning the new client a client number for use within the system 100. For example, assume a sponsoring provider enrolls and sponsors a client new to the system 100, in one embodiment, the update module 310 assigns the new client a unique client number and, in some embodiments, stores the unique client number in the sponsored registry server 101. It will be recognized that the preceding are merely examples of updating information related to the enrollment of a new client into the system 100 and other examples exist.

In one embodiment, the update module 310 updates the information in the system 100 related to the editing of data and information of a client already enrolled in the system 100. Examples of updates related to the editing of data and information of clients already enrolled in the system include, but are not limited to, one or more of updating information of the sponsored registry server 101 (e.g. the client's provider list, provider's client list, the client's sponsoring provider, etc.) and information of the sponsored databases (e.g. contact information, client insurance information, etc.).

In some embodiments, the updated information is an edit to client data and information stored on a sponsored database (e.g., the client's contact information, insurance information, etc.). For example, assume provider A used the system 100 to search for and retrieved the data and information of client A that is sponsored by provider B, and assume that provider A inquires whether the user's contact information and/or other information is current. In some embodiment, if the data and information is not current, provider A may edit the client data and information stored on its database (e.g. storage device 214). In some embodiments, it may be desirable for such edits entered by provider A to be conveyed to provider B (i.e. the sponsoring provider) in order to update client A's data and information at the sponsoring database. Such an embodiment may beneficially allow subsequent providers to retrieve up-to-date information about client A. In one embodiment, the update module 310 receives edits from a provider and conveys the edits to the sponsoring provider for implementation in the sponsored database.

In one embodiment, the edits to client data and information are automatically implemented upon receipt by the sponsoring provider. In another embodiment, the edits to client data and information are implemented subject to approval at the sponsoring provider (e.g. subject to staff 127 of the sponsoring provider verifying that the updated information is correct and approving the update via a provider device 117).

In one embodiment, the sponsored registry server 101 maintains a provider list associated with each client that includes the providers associated with each client (e.g. stored on the storage device 214 of the registry server 101). In one such embodiment, update module 310 may send the updated information to the other providers that are on that client's provider list. In one embodiment, the updated information is sent to the other providers subject to the verification and/or acceptance of the edits by the sponsoring provider.

In one embodiment, the sponsored registry server 101 maintains a client list associated with each provider that includes the clients associated with each provider (e.g. stored on the storage device 214 of the registry server 101). In one such embodiment, update module 310 may send the updated information to the other providers that include the client in its provider list. In one embodiment, the updated information is sent to the other providers subject to the verification and/or acceptance of the edits by the sponsoring provider. It will be recognized that the preceding are merely examples of updating information stored on a sponsored database and other examples exist.

In some embodiments, the update module 310 updates information of the sponsored registry server 101 (e.g. the client's provider list, provider's client list, the client's sponsoring provider, etc.). For example, assume client A desires to change his/her sponsoring provider, in one embodiment, the update module 310 updates the client's sponsoring provider. In another example, assume the client visits a new provider 120 in the system 100 and the client's provider list is stored on the sponsored registry server 101, in one embodiment, the update module 310 updates the client's provider list to include the new provider 120.

In one embodiment, the provider list includes one or more of the providers presently able to access the client's data and information, the provider's presently providing services to the client, the providers that have provided the client services in the past, and the providers that retrieved the client's data and information in the past. In one embodiment, the update module 310 updates the provider list subject to client authorization. For example, in one embodiment, the update module 310 does not update the provider list to add a provider unless the client authorizes the addition (e.g. via the interaction module 314 discussed below), and the client info retrieval module 308 does not retrieve the client data and information unless the provider requesting the retrieval is on the client's provider list.

In one embodiment, a provider's client list includes one or more of the clients whose associated data and information the provider may currently access, the clients the provider is presently providing services to, the clients that the provider provided services to in the past, and the clients whose associated data and information the provider was allowed to access and/or accessed in the past. In one embodiment, the update module 310 updates the client list subject to client authorization. For example, in one embodiment, the update module 310 does not update the client list to add a client unless the client authorizes the addition (e.g. via the interaction module 314 discussed below), and the client info retrieval module 308 does not retrieve the client data and information unless the client list of the provider requesting the retrieval includes the client. It will be recognized that the preceding are merely examples of updating information stored on a sponsored registry server 101 and other examples exist. It will be recognized that the preceding are merely examples of updating information related to the editing of data and information of a client already enrolled in the system 100 and other examples exist.

In one embodiment, the update module 310 passes the updating information to the sponsoring database. For example, the update module 310 is communicatively coupled to one or more sponsoring databases via a provider device 117 to send updating information to the sponsoring database. In another embodiment, the update module 310 (or the communication interface 302) stores the updated client data and information in the storage device 214 (or any other non-transitory storage medium communicatively accessible) of the sponsored registry server 101. The other modules of the registry module 220, including, for example, the client search module 306 can retrieve the updated information (e.g. updated sponsor-client information, provider list, client list, etc.) by accessing the storage device 214 (or other non-transitory storage medium) of the sponsored registry server 101. In another embodiment, the update module 310 (or the communication interface 302) stores the updated client data and information in the storage device 214 (or any other non-transitory storage medium communicatively accessible) of the sponsored registry server 101. The other components of the system 100, including, for example, a provider device 117, can retrieve the updated information (e.g. updated sponsor-client information, provider list, client list, etc.) by accessing the storage device 214 (or other non-transitory storage medium) of the sponsored registry server 101.

The optional accounting module 312 is code and routines for crediting and debiting provider accounts. In one embodiment, the accounting module 312 is a set of instructions executable by the processor 206. In another embodiment, the accounting module 312 is stored in the memory 208 and is accessible and executable by the processor 206. In either embodiment, the accounting module 312 is adapted for cooperation and communication with the processor 206, other components of the sponsored registry server 101, the registry module 220 and the system 100.

In some embodiments, it may be desirable to provide an incentive for sponsoring clients, which may include one or more of enrolling clients in the system 100, hosting client data and information, verifying client data and information and ensuring that client data and information is up-to-date. In some embodiment, the incentive is tracked by the accounting module 312. In one embodiment, the accounting module 312 credits and debits provider accounts. For example, assume Clinic B (i.e. a provider) retrieves the information for a client sponsored by Clinic A (i.e. another provider), in one embodiment, the accounting module 312 credits the Clinic A's account by a specific amount and debits Clinic B's account by the same amount. It will be recognized that the preceding is just an example of the accounting module tracking an incentive and that other examples exist.

In one embodiment, the debiting and crediting is performed responsive to the accounting module 312 receiving an information retrieval signal. For example, again, assume a Clinic B retrieves the data and information of a client sponsored by Clinic A, in one embodiment, the accounting module 312 responsive to the retrieval credits the Clinic A's account by a specific amount and debits Clinic B's account by the same specific amount.

In one embodiment, the specific amounts credited and debited are determined by the accounting module 312 and displayed to a provider prior to retrieving client data and information. For example, assume the staff of Clinic B searched for a client, in one embodiment, the search results displayed to the provider (discussed above) includes a specific amount associated with each user in the list of search results that is determined by the accounting module 312. In one embodiment, that specific amount is debited from the account of the provider that selects to retrieve the client data and information associated with the selected search result. For example, provider A selects to retrieve from provider B the data and information of client A which has a cost of 10, in one embodiment, the first provider's account is debited 10. In one embodiment, a specific amount is credited to the sponsoring provider of the client when the client's data and information is retrieved from the sponsored database. For example, when provider A selects to retrieve client A's data and information from provider B, in one embodiment, provider B's account is credited a specific amount.

In one embodiment, the amount is a unit of currency. For example, the amount is in U.S. dollars. In one embodiment, the amount is credits, which may or may not be monetized (i.e. the credits may or may not be exchanged for monetary value). In one embodiment, the amount debited and credited are the same amount. For example, using the example in the preceding paragraph, provider B's account is credited 10. In another embodiment, the amount debited and credited differs. For example, using the example in the preceding paragraph, provider B's account is credited 9 and the sponsored registry is credited 1 in order to fund the operation and maintenance of the sponsored registry server 101 (e.g. instead of charging a subscription for use).

In one embodiment, the amount may be based at least in part on one or more of the amount of client data and information provided by sponsoring provider, the quality of the client data and information provided by sponsoring provider, the type of client data and information retrieved by the requesting provider, and the amount of client data and information retrieved by the requesting provider. For example, the more and better information provided by the sponsoring provider and the more information retrieved by the requesting provider the greater the amount. In one embodiment, the amount may be based at least in part on the sponsoring provider. For example, the sponsoring provider may set the rates for retrieving client data and information from its sponsored database (s).

In one embodiment, the provider that retrieves client data and information is debited an amount per transaction (e.g. when the provider retrieves the client data and information or when the provider initiates an interaction with the client through the sponsored registry server 101). In one embodiment, the provider that retrieves client data and information is debited a fee per client per year (e.g. the provider pays a yearly fee while the client remains on the provider's client list). It will be recognized that the preceding are just examples of crediting and/or debiting a provider account and that other examples exist In one embodiment, the accounting module 312 (or the communication interface 302) stores the account information in the storage device 214 of the sponsored registry server 101 (or any other non-transitory storage medium communicatively accessible). The other components of the system 100, e.g., one or more of a provider device 117 and a client device 115, can retrieve the account information by accessing the storage device 214 (or other non-transitory storage medium) of the sponsored registry server 101.

The optional interaction module 314 is code and routines for allowing for interactions between one or more of a provider, a client, sponsoring provider and the sponsored registry server. In one embodiment, the interaction module 314 is a set of instructions executable by the processor 206. In another embodiment, the interaction module 314 is stored in the memory 208 and is accessible and executable by the processor 206. In either embodiment, the interaction module 314 is adapted for cooperation and communication with the processor 206, other components of the sponsored registry server 101, the registry module 220 and the system 100.

In one embodiment, the interaction module 314 interacts using one or more electronic means of communication. Examples of an electronic means of communication includes but is not limited to one or more of e-mail, instant messages, short message service (SMS) text, automated telephone menus, etc. It will be recognized that the preceding are merely examples of electronic means of communication and that other examples exist.

In one embodiment, each client's data and information includes a preferred means interaction. For example, a client may indicate that he/she wishes to interact via e-mail. In one such embodiment, the interaction module 314 interacts with the client using the chosen means. For example, the interaction module 314 queries the sponsored database to obtain the client's preferred means of interaction (e.g. the e-mail address) and initiates the interaction (e.g. sending the e-mail). In one embodiment, the chosen means may include a proxy for the client. For example, a client may be assigned a client advocate to whom interactions should be sent. It will be recognized that the preceding is merely an example of a preferred means of interaction and that other examples exist.

In one embodiment, the interaction module 314 allows interaction between the sponsored registry server 101 and the client 125. For example, assume a client must consent to the retrieval of his/her data and information by a new provider, in one embodiment, the interaction module 314 interacts with the client by sending a request for consent via the client's preferred electronic means of communication and by receiving the clients consent (or lack thereof) to the request. In another example, the assume a client must consent to the updating of his/her data and information, in one embodiment, the interaction module 314 receives an authentication code provided by the sponsored registry server 101 from the client allowing that provider to access their registry entry. To avoid fraud, in one embodiment, the authentication code may change regularly and/or be good only for a single use. In one embodiment, a client can also request that the interaction module 314 send an authentication code to them which can be given to a specific provider. In one embodiment, when an authentication code is used, the interaction module 314 may send a notification to the client and/or the sponsoring provider. It will be recognized that the preceding is merely an example of an interaction between the client and the sponsored registry server and that other examples exist.

In one embodiment, the interaction module 314 allows interaction between the sponsored registry server 101 and a provider. For example, assume a sponsoring provider is notified or must consent to the retrieval or updating of client data and information by another provider, in one embodiment, the interaction module 314 interacts with the sponsoring provider by sending a notification or request for consent via the provider's preferred electronic means of communication and by receiving the sponsoring provider's consent (or lack thereof) to the request. In another example, assume the client has decided to change his/her sponsoring provider, in one embodiment, the interaction module 314 interacts with the new and old sponsoring providers by sending a notification to each. It will be recognized that the preceding are merely examples of an interaction between the sponsored registry server and a provider and that other examples exist.

In one embodiment, a sponsoring provider may be able to see information identifying a provider retrieving a sponsored client's data and information or updating a client's data and information. For example, assume "A+Health" is a provider that retrieved a client's data and information, in one embodiment, the client's sponsoring provider is notified that "A+Health" retrieved the client's data and information. In another embodiment, the identity of a provider may be obscured or kept from the sponsoring provider. For example, again assume that "A+Health" is a provider that retrieved a client's data and information, in one embodiment, the client's sponsoring provider is notified that "Private Provider" retrieved the client's data and information. In one embodiment, when the identity of a provider is obscured from a sponsoring provider, the identity of the provider is not obscured from the client. It will be recognized that the preceding is merely one example of obscuring a provider's identity from the sponsoring provider and that other examples exist.

In one embodiment, the interaction module 314 allows interaction between a provider 120 and the client 125. For example, a provider may wish to confirm a client's upcoming appointment, in one embodiment, the interaction module 314 interacts with the client by sending the confirmation via the client's preferred electronic means of communication and by receiving a response from the client. In one embodiment, the interaction module 314 provider sends the content of the communication along with the client identifier to the sponsored registry server 101. The sponsored registry server 101 uses the sponsoring provider's sponsored database to access the preferred interaction means and information. The sponsored registry server 101 then sends the message to the client and requests that the client acknowledge receipt by sending a message back to the sponsored registry server 101. It will be recognized that the preceding is merely an example of an interaction between the client and a provider and that other examples exist.

In one embodiment, the interaction module 314 allows interaction between a provider 120 and another provider 120. In one embodiment, the interaction module 314 is used in a referral from one provider to another. For example, assume a first provider such as a social worker (or other client advocate) sponsors a client and desires to refer a client to a second provider for further treatment, in one embodiment, the interaction module 314 allows the first provider to send the client's data and information to the second provider along with notes detailing the reason for referral. The second provider may then store the client's data and information without performing a search. In another example, a provider that is a client advocate may receive a courtesy copy of any interaction sent to the client or be sent the interactions in lieu of the client. It will be recognized that the preceding is merely an example of an interaction between a provider and another provider and that other examples exist.

In one embodiment, the interaction module 314 sends the interaction to the client (e.g. via client device 115). For example, the interaction module 314 is communicatively coupled to the client device 115 to send the interaction to the client device 115. In one embodiment, the interaction module 314 sends the interaction to the provider (e.g. via provider device 117). For example, the interaction module 314 is communicatively coupled to the provider device 117 to send the interaction to the provider device 117. In another embodiment, the interaction module 314 (or the communication interface 302) stores the interaction in the storage device 214 (or any other non-transitory storage medium communicatively accessible) of the sponsored registry server 101. The other components of the system 100, e.g., one or more of a client device 115 and a provider device 117, can retrieved the interaction by accessing the storage device 214 (or other non-transitory storage medium) of the sponsored registry server 101.

The optional audit module 316 is code and routines for maintaining an audit trail of interactions. In one embodiment, the audit module 316 is a set of instructions executable by the processor 206. In another embodiment, the audit module 316 is stored in the memory 208 and is accessible and executable by the processor 206. In either embodiment, the audit module 316 is adapted for cooperation and communication with the processor 206, other components of the sponsored registry server 101, the registry module 220 and the system 100.

In one embodiment, the audit module 316 maintains an audit trail of interactions (e.g. stored on the storage device of the sponsored registry server 101). In one embodiment, the audit trail includes one or more entries. In one embodiment, an entry includes a secure hash of the message sent, i.e., in one embodiment, the registry does not store the actual message. In one embodiment, the provider is responsible for storing the message itself. In one embodiment, the entry includes one or more of the date, time, means of sending, and the identifier of the staff member 127 initiating the interaction. In one embodiment, each entry is stored as a log entry and a new audit trail entry identifier is computed for that entry by creating a secure hash of the previous audit trail entry identifier combined with this log entry, thus creating a secure, ordered hash chain of entries. Any responses from the client are sent back to the provider and similarly logged. In one embodiment, the sponsoring provider for the client is also notified of the communications.

In one embodiment, an audit trail may be tagged by a provider. For example, in one embodiment the audit module 316 allows a staff member to "tag" an interaction as "successfully completed," "in progress," "abandoned," etc. In one embodiment, the audit module 316 may initiate the collection of a tag by sending a request to the staff member 127 to supply a tag. It will be recognized that the preceding are merely examples of tags and that other examples exist.

In one embodiment, the audit module 316 sends the audit trail to a provider 120. For example, the audit module 316 is communicatively coupled to a provider device 117 to send the audit trail to the provider device 117. In another embodiment, the audit module 316 (or the communication interface 302) stores the audit trail in the storage device 214 (or any other non-transitory storage medium communicatively accessible) of the sponsored registry server 101. The other components of the system 100, e.g., a provider device 117, can retrieve the audit trail by accessing the storage device 214 (or other non-transitory storage medium) of the sponsored registry server 101.

The optional client/provider rating module 318 is code and routines for rating one or more of clients and providers. In one embodiment, the client/provider rating module 318 is a set of instructions executable by the processor 206. In another embodiment, the client/provider rating module 318 is stored in the memory 208 and is accessible and executable by the processor 206. In either embodiment, the client/provider rating module 318 is adapted for cooperation and communication with the processor 206, other components of the sponsored registry server 101, the registry module 220 and the system 100.

The client/provider rating module 318 rates one or more of clients and providers. In one embodiment, rating one or more of clients and providers includes one or more of gathering indicators of service quality, calculating the service quality score for a given interaction between provider and client, and aggregating service quality scores to create ratings for clients and/or providers.

In one embodiment, an indicator of service quality is numerical rating on a scale. For example, a rating on the scale 1-100 where 100 is the best possible performance or 1-5 stars where 5 stars is the best possible performance. It will be recognized that the preceding are merely examples of indicators and that other examples exist.

In one embodiment, the client/provider rating module 318 receives one or more indicators from one or more clients rating the performance of a provider. For example, the client arrived on time for an appointment and had to wait 20 minutes to be seen, so the client rated the provider at an 80 on the 100 point scale, which is received by the client/provider rating module 318. It will be recognized that the preceding is merely an example of receiving an indicator from a client and that other examples exist.

In one embodiment, the client/provider rating module 318 receives one or more indicators from one or more providers rating the performance of a client. For example, the client missed an appointment, did not adhere with a prescribed protocol, has not responded to a rescheduling request and has not paid for the care provided, so the provider rates the client at a 5 on the 100 point scale, which is received by the client/provider rating module 318. In one embodiment, the client/provider rating module 318 receives one or more indicators from one or more providers acting as a client advocate. For example, a client's social worker may rate a provider. It will be recognized that the preceding are merely examples of receiving an indicator from a provider and that other examples exist In one embodiment, the client/provider rating module 318 aggregates the indicators for each client and/or provider. For example, the client/provider rating module 318 aggregates a plurality of indicators for a single client or provider into an overall quality score for that client or provider. In one embodiment, the client/provider rating module 318 determines an average of the indicators. In one embodiment, the average may weight individual indicators differently. In one embodiment, the aggregated indicators may be normalized across clients and/or providers. In one embodiment, an overall quality rating may be displayed along with other data and information regarding a client. Such information may be used by providers to, for example, allocating resources, assigning clients to specific service regimens, or assessing the performance of a provider.

In one embodiment, the client/provider rating module 318 sends the audit trail to one or more of a provider 120 and a client 125. For example, the audit module 316 is communicatively coupled to one or more of a provider device 117 and a client device 115 to send the audit trail to the provider device 117 or client device 115, respectively. In another embodiment, the audit module 316 (or the communication interface 302) stores the audit trail in the storage device 214 (or any other non-transitory storage medium communicatively accessible) of the sponsored registry server 101. The other components of the system 100, e.g., one or more of a provider device 117 and a user device, can retrieve the audit trail by accessing the storage device 214 (or other non-transitory storage medium) of the sponsored registry server 101.

Figure 4:
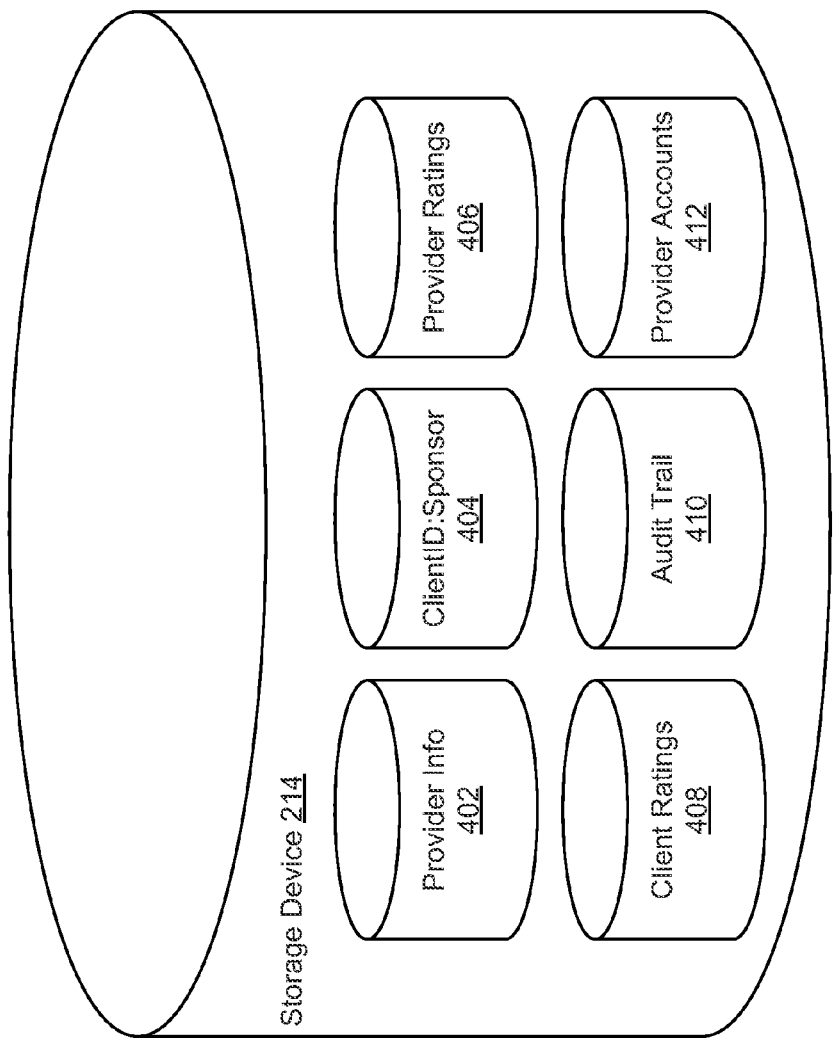
FIG. 4 is a block diagram illustrating a storage device of a sponsored registry server according to one embodiment.

FIG. 4 illustrates an example of a storage device 214 of a sponsored registry server 101 according to one embodiment. In one embodiment, the storage device 214 of a sponsored registry server 101 includes provider info 402, ClientID: Sponsor 404, provider ratings 406, client ratings 408, audit trail 410 and provider accounts 412.

In one embodiment, the provider info 402 stores data associated with the registered providers 120 and staff 127. For example, each registered provider has one or more registered staff and the sponsored registry server 101 maintains their name, a provider identifier, phone number, and email for the staff in the provider info 402. In another example, each registered provider also has a registered interface to their client database that the sponsored registry server 101 uses to communicate with the database (e.g. through an API) which is stored in the provider info 402. In one embodiment, the ClientID:Sponsor 404 stores sponsor-client information. In some embodiments, one or more of the clients and providers are associated with one or more ratings. In the illustrated embodiment, the ratings associated with the providers are stored in the provider ratings 406, and the ratings associated with clients are stored in the client ratings 408. In one embodiment, the audit trail 410 store and maintain a trail of all communications to/from clients and providers. In one embodiment, the provider accounts 412 stores accounts for providers. For example, each account may include one or more of a transaction history of credits and debits and an account balance reflecting the sum of the credits and debits.

It will be recognized that the preceding is merely an example of the kind of data and the data structure possible in a sponsored registry server's storage device 214 and that other examples exist. For example, in some embodiments, the data structure may be different and/or include more, less, different or other data types and categories.

Methods

Figure 5A:
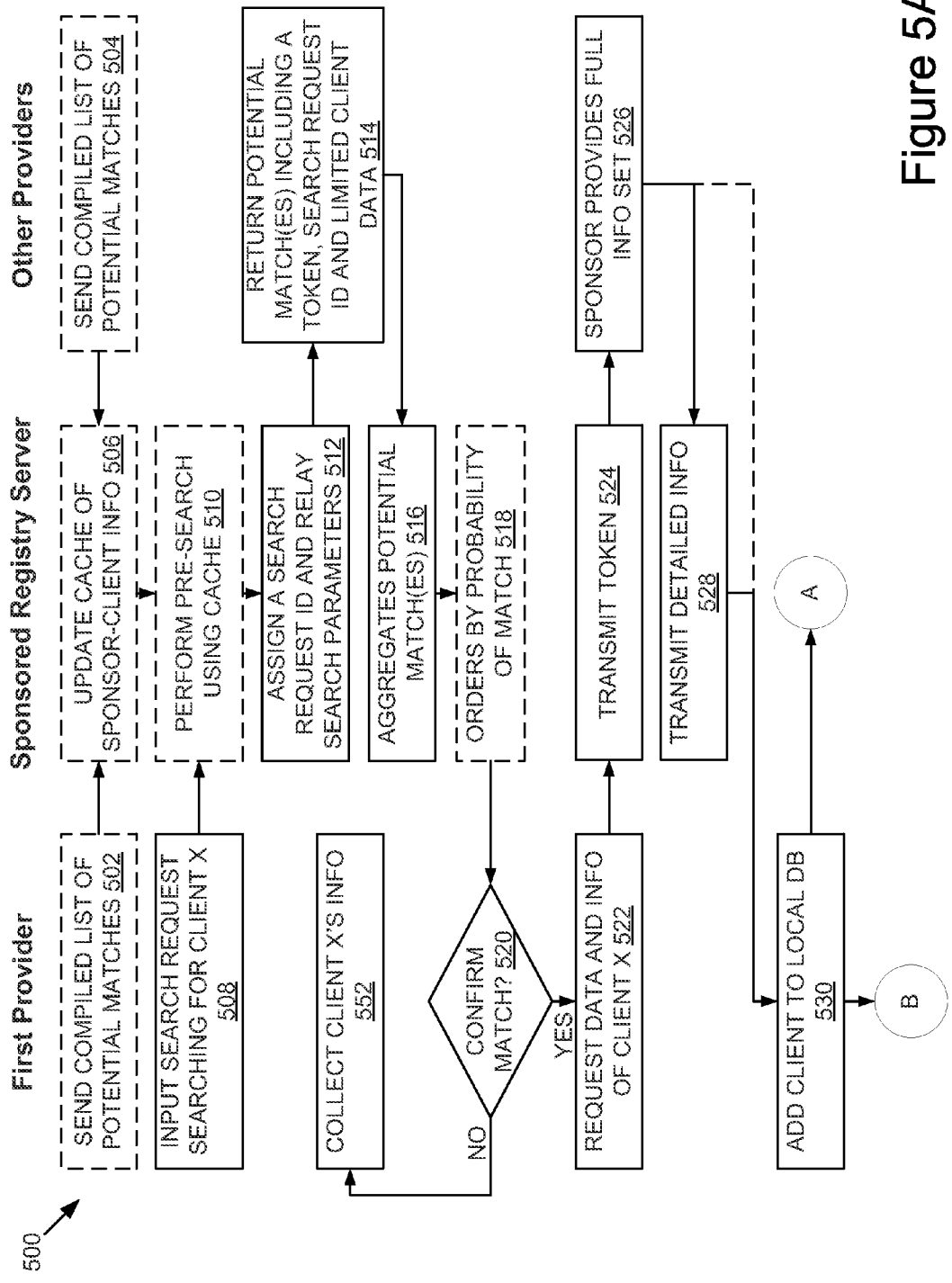
FIGS. 5A and 5B are flow charts illustrating a method for coordinating and improving communication using a sponsored registry according to one embodiment.
Figure 5B:
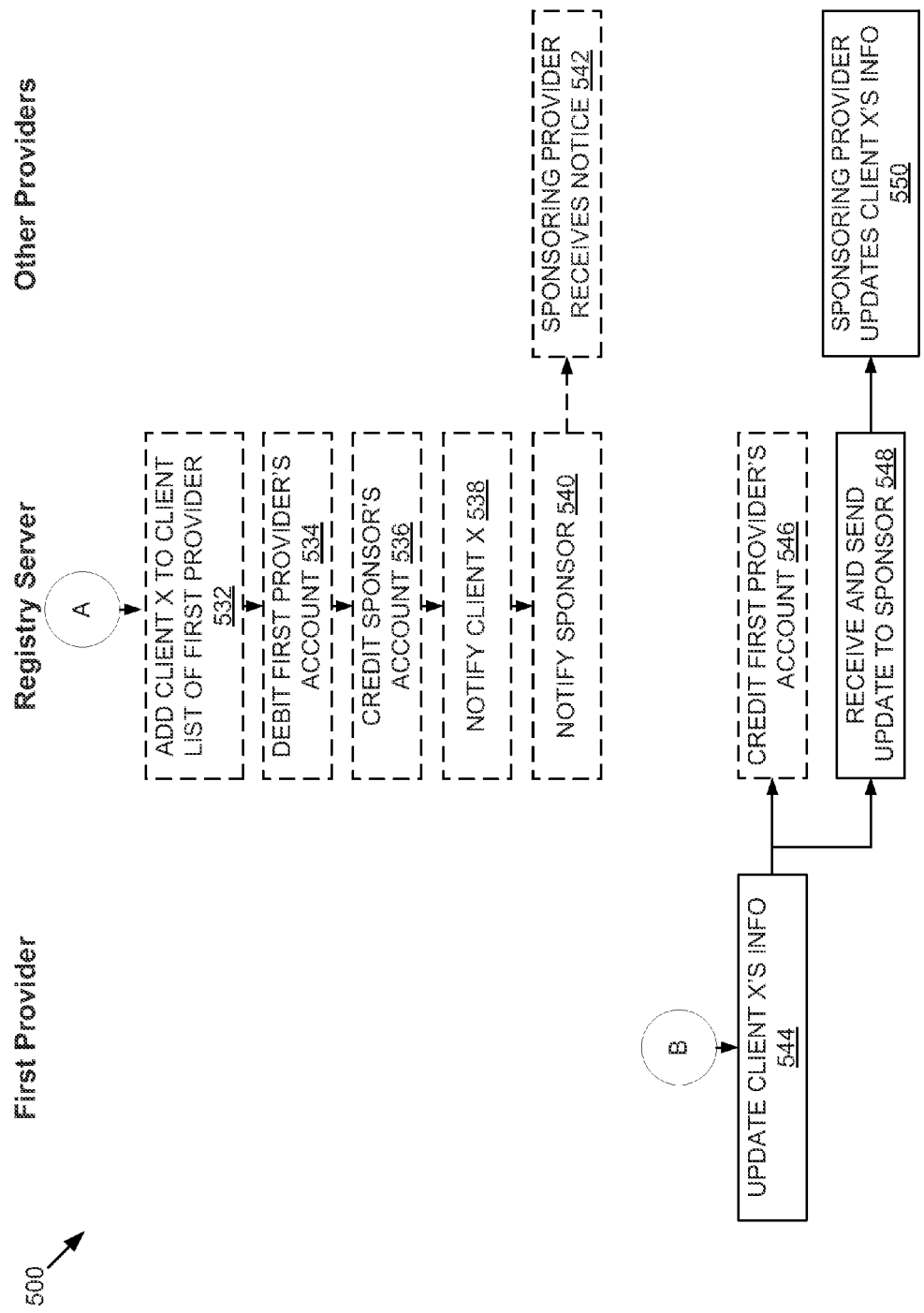
Figure 6:
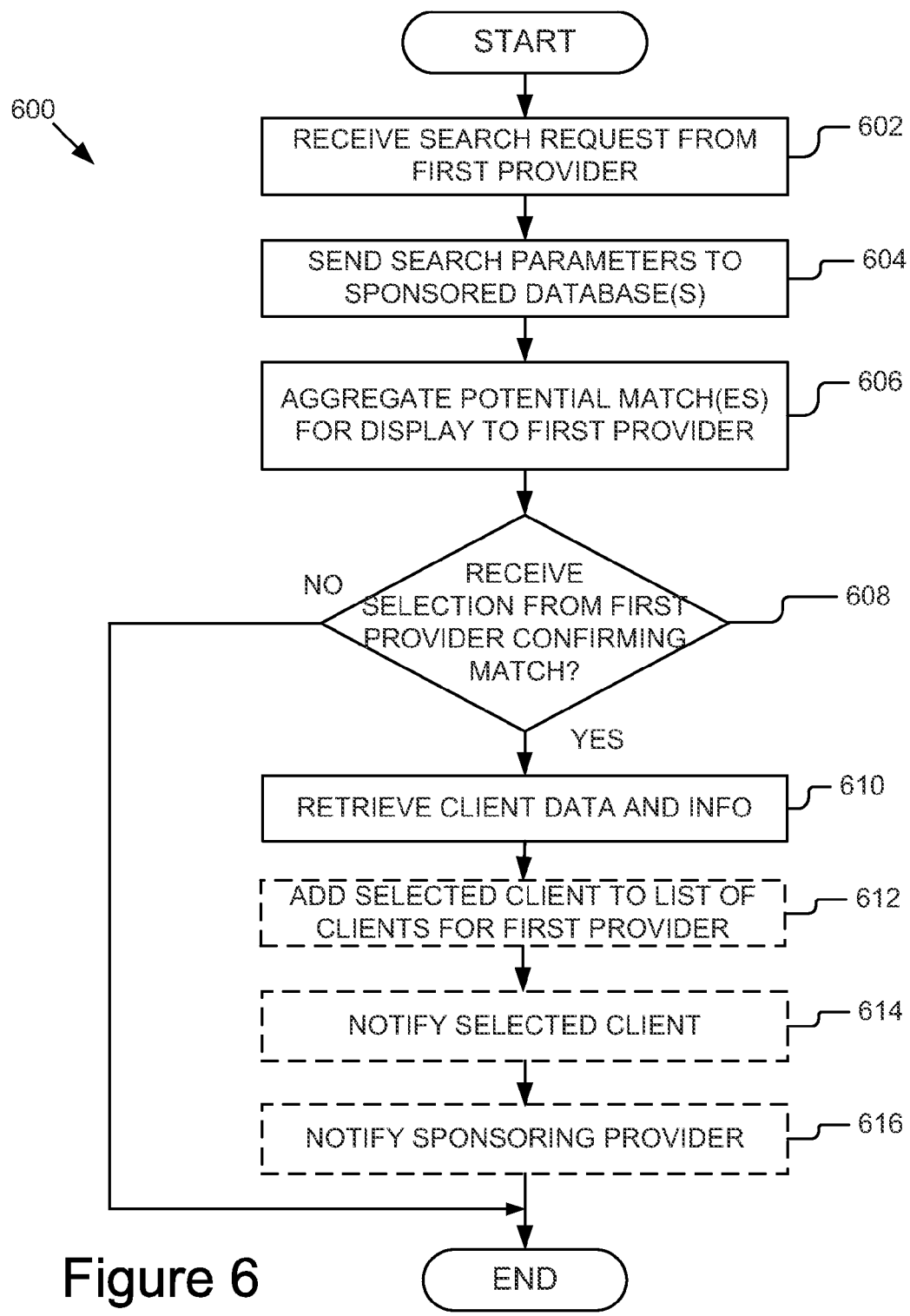
FIG. 6 is a flow chart illustrating another method for coordinating and improving communication using a sponsored registry according to another embodiment.

FIGS. 5A-B and 6 depict various methods 500, 600 performed by the system described above in reference to FIGS. 1-4. Steps that are optional or performed by optional modules are depicted in dashed boxes.

FIGS. 5A and 5B are a flow chart illustrating a method 500 for coordinating and improving communication using a sponsored registry according to one embodiment. Referring first to FIG. 5A, at step 508, the first provider sends a search request including one or more search parameters. In one embodiment, at step 510, the client search module 306 of the registry module 220 performs a pre-search using a cache of sponsor-client information. In one embodiment, at step 506, the cache is updated by the update module 310 when the first provider and/or one or more of the other providers sends a compiled list of potential matches to the sponsored registry server as illustrated by step 502 and step 504, respectively. At step 512, the client search module 306 coordinates the search of the sponsored databases of the other providers by assigning a search request ID and sending the search parameters and search request ID to the sponsored databases of the other providers. At step 506, the sponsored databases of the other providers conduct a search and return potential matches including a token, the search request ID and a limited set of client data. At step 516, the client search module 306 aggregates the potential match(es) and optionally ranks the potential matches, at step 518, based on the probability of match determined by either the sponsored registry server or sponsoring database.

At step 520, the first provider receives the aggregated list of search results and determines whether a search result matches client X. If the first provider determines no search result matches client X (520—No), the first provider collects client X's info at step 552 and may decide to sponsor client X (not shown). If the first provider determines a search result matches client X (520—Yes), the first provider requests client X's data and information at step 522.

At step 524, the client info retrieval module 308 retrieves client X's info by transmitting the token associated with the selected search result to the sponsored database of client X's sponsoring provider. At step 526, the sponsoring database provides client X's data and information. Depending upon the embodiment, the sponsoring database provides client X's data and information directly to the first provider or through the client info retrieval module 308 of the sponsored registry server 101 at step 528. At step 530, the first provider stores client X's data and information to its local database. In some embodiments, the method continues as illustrated in FIG. 5B.

Referring now to FIG. 5B, at step 532, the update module 310 updates the client list of the first provider by adding client X to the first provider's client list. At step 534, the accounting module 312 debits the account of the first provider. At step 536, the accounting module 312 credits the sponsoring provider's account. At step 538, the interaction module 314 notifies client X that the first provider added him/her as a client. At step 540, the interaction module 314 notifies the sponsor that client X has been added the first provider's client list. At step 542, the sponsoring provider receives the notification that client X has been added the first provider's client list.

When the first provider updates client X's information at step 544, the accounting module 312 credits the first provider's account at step 546. At step 548, the update module 310 receives the update from the first provider and sends the update to the sponsoring provider. At step 550, the sponsoring provider updates the data and information of client X.

FIG. 6 is a flow chart illustrating another method 600 for coordinating and improving communication using a sponsored registry according to one embodiment. At step 602, the client search module 306 of the registry module 220 receives a search request from the first provider. At step 604, the client search module 306 coordinates the search of the distributed sponsored database(s) of the system 100 by sending the search parameters to the sponsored database(s). At step 606, the client search module 306 aggregates received the potential matches received from the sponsored database(s) for display to the first provider. At step 608, the client info retrieval module 308 determines whether a selection confirming a match has been received from the first provider. When the client info retrieval module 308 determines that a selection confirming the absence of a match has been received (608—No), the method 600 ends. When the client info retrieval module 308 determines that a selection confirming a match has been received (608—Yes), the method continues at step 610.

At step 610, the client info retrieval module 308 retrieves the client data and information from the sponsored database. At step 612, the update module 310 updates the client list of the first provider by adding client X to the first provider's client list. At step 614, the interaction module 314 notifies the selected client that the first provider added him/her as a client. At step 616, the interaction module 314 notifies the sponsor of the selected client that the selected client has been added to the first provider's client list.

The foregoing description of the embodiments has been presented for the purposes of illustration and description. It is not intended to be exhaustive or to limit the present embodiments to the precise forms disclosed. Many modifications and variations are possible in light of the above teaching. It is intended that the scope of the present embodiments be limited not by this detailed description, but rather by the claims of this application. As will be understood by those familiar with the art, the present embodiments may take other specific forms without departing from the spirit or essential characteristics thereof. Likewise, the particular naming and division of the modules, routines, features, attributes, methodologies and other aspects are not mandatory or significant, and the mechanisms that implement one embodiment or its features may have different names, divisions and/or formats. Furthermore, as will be apparent, the modules, routines, features, attributes, methodologies and other aspects of the embodiments can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the embodiments are in no way limited to implementation in any specific programming language, or for any specific operating system or environment. Accordingly, the disclosure is intended to be illustrative, but not limiting, of the scope, which is set forth in the following claims.

What is claimed is:

1. A computer-implemented method for coordinating and improving communication using a sponsored registry, the method comprising:

receiving, using one or more processors, a search request from a first provider including one or more search parameters associated with a client;

coordinating, using one or more processors, a search by one or more distributed sponsored databases based on the one or more search parameters, a sponsored database associated with a sponsoring provider and storing client data for one or more sponsored clients, the sponsoring provider responsible for verifying and maintaining accurate client data for the one or more sponsored clients;

maintaining, using one or more processors, a database, the database associating a token identifier with a specific client record;

obtaining, using one or more processors, search results from the one or more distributed sponsored databases including a search result associated with the client, wherein any particular client is sponsored by one sponsored database at most;
sending, using one or more processors, the search results for display to the first provider;
receiving, using one or more processors, a request for the client's data and information, the request including the selection of the client and associated token identifier from the search results;
retrieving, using one or more processors, the client's data and information from the sponsored database storing the client's data and information based on the token identifier.

2. The method of claim 1, the method further comprising:
debiting an account of the first provider a first amount responsive to the retrieval of the client's data and information; and
crediting an account of a sponsoring provider associated with the sponsored database from which the client data and information is retrieved a second amount responsive to the retrieval of the client's data and information.

3. The method of claim 2, wherein the first amount and second amount are equal.

4. The method of claim 1, the method further comprising:
receiving updating information updating the client's data and information from the first provider; and
sending the updating information to a sponsoring provider associated with the sponsored database from which the client's data and information was obtained to update the client's data and information in the sponsored database.

5. The method of claim 4, wherein the client's data and information is updated in the sponsored database subject to approval of the sponsoring provider.

6. The method of claim 1, wherein the retrieval of the client's data and information is subject to receiving the client's consent.

7. The method of claim 6, the method further comprising:
sending a request for consent to the client; and
retrieving the client's data and information based at least in part on a response received from the client.

8. The method of claim 7, wherein the request for consent is sent using the client's preferred contact method.

9. The method of claim 1, the method further comprising:
sending a communication to one or more of the client, the first provider and another provider, the communication sent by a sponsored registry server.

10. The method of claim 9, the method further comprising:
creating an audit trail including the communication.

11. The method of claim 10, wherein audit trail entries are tagged by the first provider.

12. The method of claim 1, the method further comprising:
receiving one or more indicators rating performance of the first provider; and
calculating an overall score for the first provider.

13. The method of claim 1, the method further comprising:
receiving one or more indicators rating performance of the client; and
calculating an overall score for the client.

14. The method of claim 1, wherein the one or more search parameters are one or more client identifiers.

15. The method of claim 1, wherein coordinating the search of the one or more distributed sponsored databases includes a pre-search using a cache of sponsor-client information.

16. A computer program product comprising a non-transitory computer readable medium encoding instructions that, in response to execution by a computing device, cause the computing device to perform operations comprising:
receiving a search request from a first provider including one or more search parameters associated with a client;
coordinating a search by one or more distributed sponsored databases based on the one or more search parameters, a sponsored database associated with a sponsoring provider and storing client data for one or more sponsored clients, the sponsoring provider responsible for verifying and maintaining accurate client data for the one or more sponsored clients;
maintaining a database, the database associating a token identifier with a specific client record;
obtaining search results from the one or more distributed sponsored databases including a search result associated with the client, wherein any particular client is sponsored by one sponsored database at most;
sending the search results for display to the first provider;
receiving a request for the client's data and information, the request including the selection of the client and associated token identifier from the search results;
retrieving the client's data and information from the sponsored database storing the client's data and information based on the token identifier.

17. A system for coordinating and improving communication using a sponsored registry, the system comprising:
a client search module stored on a memory and executed by one or more processors to receive a search request from a first provider including one or more search parameters associated with a client, to coordinate a search by one or more distributed sponsored databases based on the one or more search parameters, a sponsored database associated with a sponsoring provider and storing client data for one or more sponsored clients, the sponsoring provider responsible for verifying and maintaining accurate client data for the one or more sponsored clients, obtain search results from the one or more distributed sponsored databases including a search result associated with the client, wherein any particular client is sponsored by one sponsored database at most and send the search results for display to the first provider;
a client info retrieval module stored on a memory and executed by one or more processors to receive a request for the client's data and information, the request including the selection of the client and an associated token identifier from the search results and retrieve the client's data and information from the sponsored database storing the client's data and information based on the token identifier.

18. The system of claim 17 further comprising:
an accounting module operable to debit an account of the first provider a first amount responsive to the retrieval of the client's data and information and credit an account of a sponsoring provider associated with the sponsored database from which the client data and information is retrieved a second amount responsive to the retrieval of the client's data and information.

19. The system of claim 18, wherein the first amount and second amount are equal.

20. The system of claim 17 further comprising:
an update module operable to receive updating information updating the client's data and information from the first provider and to send the updating information to a sponsoring provider associated with the sponsored database from which the client's data and information was obtained to update the client's data and information in the sponsored database.

* * * * *